United States Patent [19]
Anderson

[11] 3,986,168
[45] Oct. 12, 1976

[54] MULTICHANNEL ERROR SIGNAL GENERATOR

[75] Inventor: Alfred T. Anderson, St. Petersburg, Fla.

[73] Assignee: NCR Corporation, Dayton, Ohio

[22] Filed: June 2, 1975

[21] Appl. No.: 580,261

[52] U.S. Cl. .................. 340/146.1 AX; 235/152; 340/146.1 AL; 340/146.1 E
[51] Int. Cl.² .................... H04B 3/46; G08C 25/00
[58] Field of Search .......... 235/152; 340/146.1 AL, 340/146.1 AX, 146.1 E

[56] References Cited
OTHER PUBLICATIONS

Frey, A. H. et al. *Digital Pseudorandom Error and Burst Error Generator*, in IBM Tech. Disc. Bull. 11(12): May 1969, pp. 1718–1719.

Smith, G. L. *Halftone Image Produced by Pseudorandom Bit Generator*, in IBM Tech. Disc. Bull. 17(7): Dec. 1974, pp. 1858–1859.

*Primary Examiner*—R. Stephen Dildine, Jr.
*Attorney, Agent, or Firm*—J. T. Cavender; Albert L. Sessler, Jr.; Edward Dugas

[57] ABSTRACT

A digital error signal generator produces a pseudorandom bit sequence having a predetermined probability density. Selective multiple pseudorandom bit densities, each having a predetermined probability density, are obtained from a single original pseudorandom bit sequence. Multiple data channels are serviced simultaneously by a single error signal generator with the probability density being individually selective for each channel.

6 Claims, 3 Drawing Figures

MULTICHANNEL ERROR SIGNAL GENERATOR

The present invention refers to digital error signal generators and more particularly to a digital error signal generator having selectable error densities.

Random bit errors occur on binary data transmission channels just as white noise occurs on analog channels. For test purposes it is often desirable to have a bit error generator which can be used to simulate such errors under controlled laboratory conditions. If more than one channel is to be tested, as is common with digital telephone equipment for example, a number of such generators may be required.

A bit-error generator puts out a stream of bits, synchronized with the channel data, in which a ONE indicates that an error should occur and a ZERO that no error should occur. This stream of bits is then combined with the channel data using an EXCLUSIVE-OR which inverts the channel data (causes an error) whenever the error generator output is ONE. Density of errors (probability of ONE in the error generator output) is usually adjustable under operator control, and distribution of the errors should be as nearly random as possible.

Pseudorandom or maximal length shift register sequences have good randomness properties and a 50% density on ONE's and ZERO's. In this disclosure a technique is described for the generation of multiple bit error sequences. All of the output error sequences are derived from a single pseudorandom sequence. The density of errors on each of the output sequences can be separately selected from a discrete set of error densities.

It is, therefore, an object of the present invention to provide a new and improved digital error signal generator.

Another object is to provide an error signal generator having selectable error densities.

An additional object is to provide an all-digital signal generator of multichannel error signals from a single pseudorandom sequence.

A further object is to provide an error signal generator in which error densities are selectable to within an accuracy limited only by the amount of hardware employed rather than the precision of the hardware.

Further objects and advantages will become apparent from the following detailed description taken in conjunction with the accompanying drawings in which.

Figure 1:
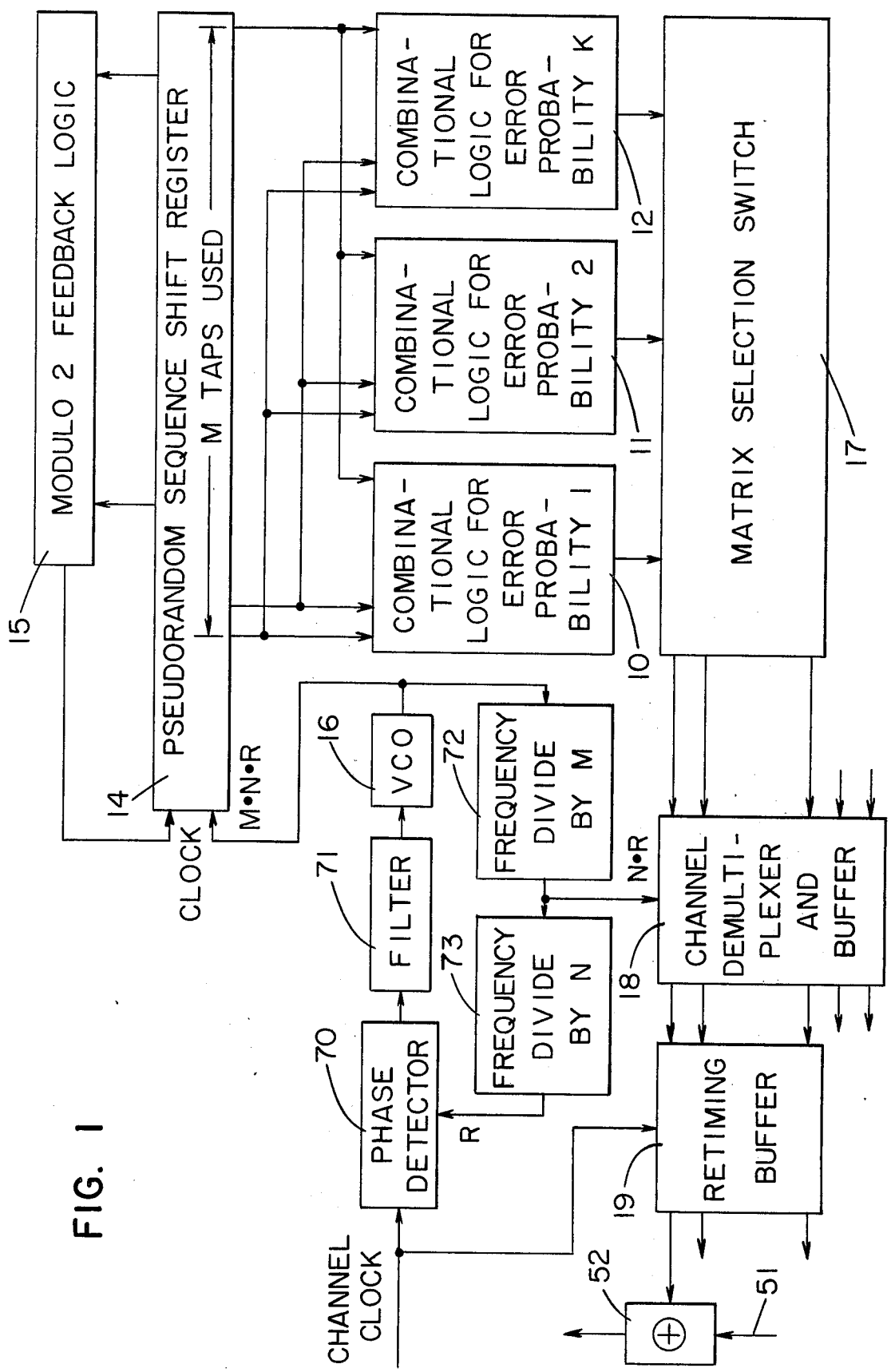
FIG. 1 is a block diagram of a preferred embodiment of the invention.

While this invention is susceptible of embodiment in many different forms, there is shown in the drawings and will herein be described in further detail, an embodiment of the invention with the understanding that the present disclosures are to be considered as exemplifications of the principles of the invention and are not intended to limit the invention to the embodiments herein described. The scope of the invention will be pointed out in the appended claims.

Referring to FIG. 1, three combinational logic circuits 10, 11, and 12, have their inputs connected to $m$ taps on a pseudorandom sequence shift register 14. Two taps of the shift register 14 are connected to a modulo 2 feedback logic circuit 15 whose output is connected to the input of shift register 14. Clock pulses to operate the shift register 14 are received from a variable control oscillator 16. The feedback logic circuit 15 is preferably an EXCLUSIVE-OR gate. The shift register 14 and the modulo feedback logic circuit 15 form a pseudorandom sequence generator. Extremely long sequences can be generated with just a few components using LSI circuitry. Pseudorandom sequences are described in *Shift Register Sequences* by S. W. Golomb published by Holden-Day Inc., 1961. Each time the shift register 14 is clocked by the variably controlled oscillator 16, two new inputs are supplied to feedback 15. This EXCLUSIVE-OR gate provides either a ONE or a ZERO into the first stage of the shift register 14. The shift register 14 may have any number of stages but it is generally desirable to use a maximal length shift register sequence to generate the pseudorandom bit stream. For example, a 23 stage register will provide a bit stream of length $2^{23} - 1 = 8,388,607$ bits.

In prior art digital error generators it has been customary to utilize the output of such a pseudorandom sequence generator as the stream of error signals to be introduced into a digital channel which is to be tested. The state of the art is represented, for example, by U.S. Pat. No. 3,633,015 issued to Francis F. Lee on Jan. 4, 1972. The density of ONE's and ZERO's in such a pseudorandom maximal shift register is 50%. This density can be varied initially by controlling the initial set-up of the shift register. In the present invention the 50% density is desirable and, therefore, no attempt is made to vary it by initial input into the shift register 14.

Figure 2:
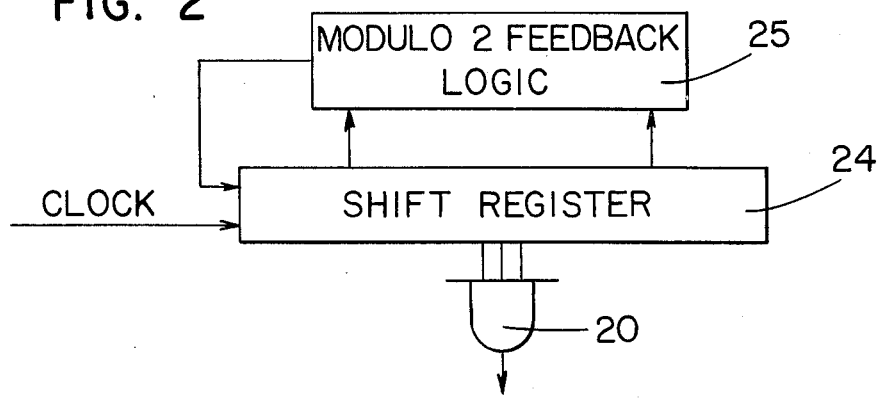
FIG. 2 is a schematic diagram of a combinational logic circuit with a driving pseudorandom sequence generator which may be employed in the embodiment of the invention illustrated in FIG. 1.

Referring to FIG. 2, a pseudorandom sequence generator is illustrated connected to a combinational logic circuit which may be utilized as any one of the combinational logic circuits 10, 11, or 12, as shown in FIG. 1. A pseudorandom sequence shift register 24, similar to shift register 14, is connected in the same manner to a modulo 2 feedback logic circuit 25 to provide a pseudorandom sequence generator similar to the one illustrated in FIG. 1. A combinational logic circuit is composed of the AND gate 20 which has its three inputs connected to three of the taps of the shift register 24. Data at each tap in the pseudorandom sequence register 24 has a probability one-half of being ONE. For each shift of the shift register, whether it be clocked once or a number of times, the probability of ONE in the gate output is $2^{-3} = \frac{1}{8}$. Therefore, the output of this combinational logic circuit is also random and, more importantly, it has a probability of ONE density fixed at a definite value which is dependent only upon the structure of the combinational logic circuit.

Generally, the desirable bit error densities are not powers of one-half and more complex logic must be used. The circuitry illustrated in FIG. 3 will result in secondary sequence of bits with probabilities of ONE approximately equal to $10^{-1}$, $10^{-2}$, and $10^{-3}$. A pseudorandom sequence shift register 34 and a modular 2 logic feedback circuit 35 are connected in the same manner as those in FIGS. 1 and 2 to provide a similar pseudorandom generator. A set of three AND gates 22, 23, and 24 which have their inputs connected to different taps in the shift register 34, have their outputs connected to the inputs of an OR gate 26. The output of the OR gate 26 will be a stream of bits in which the probability of each bit being ONE is approximately $10^{-1}$. The AND gate 22 has four inputs to provide an output density of $2^{-4}$. The AND gate 23 has five inputs for an output density of $2^{-5}$ and the AND gate 24 has seven inputs for an output density of $2^{-7}$. Thus the probability of ONE can be found from:

$$P_1 (ONE) = (2^{-4} + 2^{-5} + 2^{-7})$$
$$\quad -(2^{-4} \cdot 2^{-5} + 2^{-4} \cdot 2^{-7} + 2^{-5} \cdot 2^{-7})$$
$$\quad +(2^{-4} \cdot 2^{-5} \cdot 2^{-7})$$
$$P (ONE) = .099$$

It is desired that the output of an OR gate 27 have a probability of ONE density equal to approximately $10^{-2}$. Its inputs are connected to the outputs of the seven input AND gate 24 and to the output of a nine input AND gate 25. The inputs to the AND gate 25 are connected to separate taps of the shift register 34. Since the output of the AND gate 25 has a probability of ONE density equal to $2^{-9}$, the probability of n ONE appearing at the output of OR gate 27 can be found from:

$$P_2 (ONE) = (2^{-7} + 2^{-9}) - (2^{-7} \cdot 2^{-9})$$
$$P_2 (ONE) = 0.0098$$

It is desired that each bit appearing at the output of an AND gate 28 to be approximately $10^{-3}$. This is accomplished by having one of the inputs connected to the output of AND gate 25 and its other input connected to a separate tap of the register 34. The probability of ONE appearing at its output may be found from:

$$P_3 (ONE) = 2^{-9} \cdot 2^{-1} = 2^{-10}$$
$$P_3 (ONE) = 0.00098$$

If these probabilities were not exact enough for a particular application other more complex logic circuits can be found which approximate the desired probabilities more closely.

Figure 3:
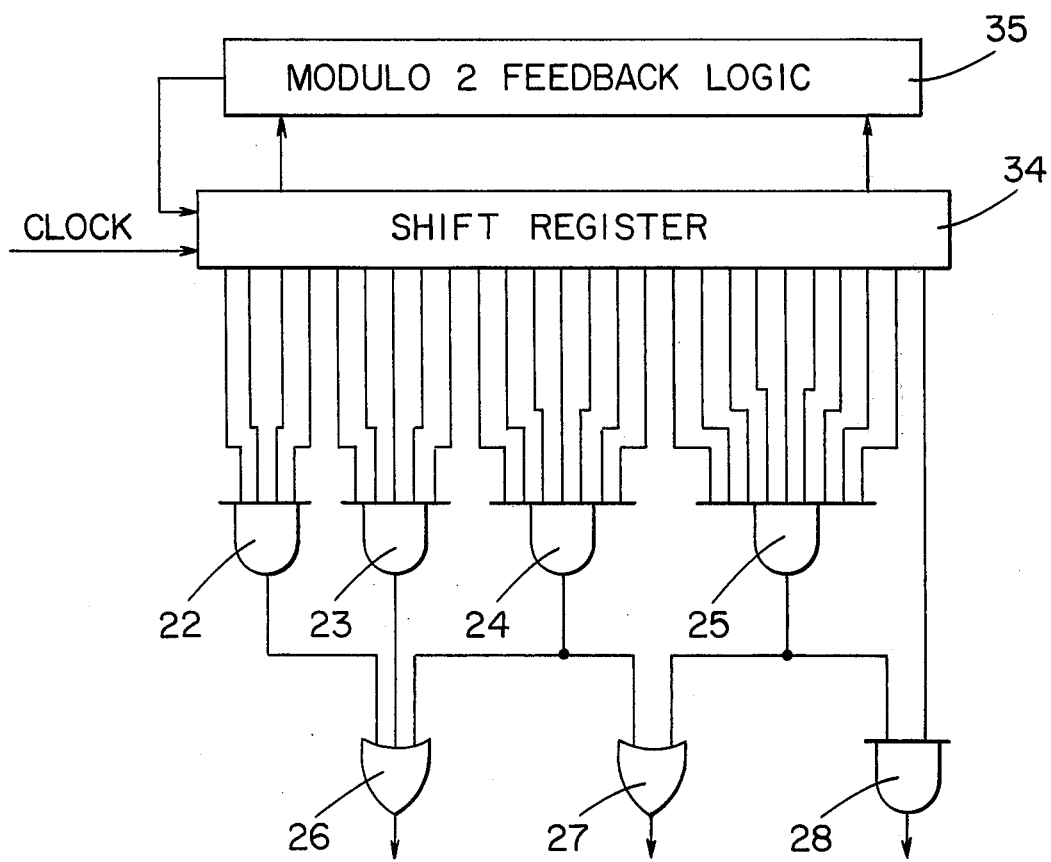
FIG. 3 is a schematic diagram of another combinational logic circuit with a driving pseudorandom sequence generator which may be employed in the embodiment of the invention illustrated in FIG. 1.

It is important that no tap of the generator shift register be used more than once in the combinational logic generating any one secondary sequence. However, the logic generating one secondary sequence may use the same taps as that generating another, resulting in a reduction in combinational logic. In FIG. 3, for example, AND gate 24 output is used for both $10^{-1}$ and $10^{-2}$ secondary sequences. Since $2^{-4}$ and $2^{-5}$ are never used when $2^{-9}$ is used, the $2^{-4}$ and $2^{-5}$ gates could be connected to the same taps of a shift register as the $2^{-9}$ gate. However, they could not be connected to any of the same taps as the $2^{-7}$ gate since $2^{-4}$, $2^{-5}$ and $2^{-7}$ are all used to generate $10^{-1}$.

Although the combinational logic circuits 10, 11, and 12 may combine register taps and may combine gates, they are illustrated as separate blocks in FIG. 1 for clarity of understanding of the invention. Logic circuit 10 of FIG. 1 utilizes AND gates 22, 23, and 24 with OR gate 26 as shown in FIG. 3, to produce output bits with a probability of ONE equal to approximately $10^{-1}$ each time register 14 is clocked to provide a new set of inputs for the AND gates. Combinational logic circuit 11 is composed of the OR gate 27 and the two AND gates 24 and 25 to provide output bits with a probability of $10^{-2}$. Combinational logic circuit 12 is composed of the AND gates 25 and 28 to provide an output probability of $10^{-3}$.

The outputs of the three logic circuits are connected to a matrix selection switch 17. The switch 17 has $n$ outputs connected to a channel demultiplexer and buffer 18. The demultiplexer and buffer 18 has $n$ outputs which are connected to the inputs of a retiming buffer 19. The $n$ outputs of the switch 17 are equal to the number of binary data channels to be tested at the same time. For each of the $n$ outputs of switch 17, a density probability of ONE may be manually selected by an operator by manipulating a separate control in the switch 17 to select the output of either logic circuit 10, logic circuit 11 or logic circuit 12. Assuming that the number of channels to be tested is 12, 12 outputs would be provided from the switch 17. Each output at any given time could have a probability of 0.1, 0.01 or 0.001 without affecting the probability densities being provided on the other outputs. Each output of the retiming buffer 19 is connected to a data channel such as 51 through an EXCLUSIVE-OR gate such as 52 which inverts the channel data (causes an error) whenever the error generator output from the buffer 19 is ONE. Channel clock pulses are connected to an input of a phase detector 70 and to the retiming buffer 19. An output of the phase detector 70 is connected to a filter 71 to control the frequency of the variable control oscillator 16. The output of variable control oscillator 16 is $M \times N \times R$, where M is greater than or equal to $m$, the number of the taps utilized by the logic circuits in shift register 14. N is greater than or equal to $n$, the number of channels to be tested and R is equal to the channel clock rate. For example, if $m$ equal 14 taps used, $n$ equals 12 data channels and the channel clock rate is 32,000 per second, the shift register clock rate provided by the variable control oscillator 16 must be at least 5,176,000. M is made equal or greater than $m$ so that all taps used to produce each sequential secondary sequence bit is produced from a completely new set of bits in the shift register, thereby making the secondary sequences substantially uncorrelated. M could be very much larger than $m$.

To prevent correlation for short time shifts among output channels, only one of the secondary sequence outputs is transferred to the output buffer 19 at a time. The pseudorandom sequence is then shifted until an entirely new set of bits is in the $m$ shift register taps before the next secondary sequence bit is transferred to the output. This function is accomplished in the output demultiplexer and buffer 18. As aforestated, the pseudorandom sequence generator must be clocked M times betweeen each time a secondary sequence bit is read into the demultiplexer 18, where M is greater than or equal to the number of taps $m$ observed by the combinational logic. To accomplish this function, the input of a frequency divider 72 is connected between the output of the variable control oscillator 16 and the demultiplexer and buffer 18 to provide a clock rate of $N \times R$ to the demultiplexer and buffer.

After each of the N-channel outputs have been buffered 18, all will be transferred to the retiming buffer 19 at once so that all outputs are synchronous with data transmissions on the channels 51–62. To provide this retiming, the channel clock rate is as aforestated provided to the retiming buffer 19.

The output of the frequency divider 72 is connected to the phase detector 70 through a second frequency divider 73 which divides the $N \times R$ clock rate by N to provide the R output rate of the variable control oscillator 16. Therefore, the variable control oscillator 16 is phase locked with the channel clock.

To insure that the entire pseudorandom sequence is used on each channel before it repeats, the number of clock pulses to the shift register per output bit should be relatively prime with the shift register sequence length. This is easily accomplished by making both M and N be powers of 2 because the pseudorandom sequence length $2^j-1$ is always odd and thus does not contain 2 as a factor. (M is greater than or equal to the number of taps of the shift register 14 which are observed by the combinational logics 10, 11, and 12, and N is greater than or equal to the number of output channels $n$). Using powers of 2 for M and N has the secondary benefit of simplifying the frequency divider circuitry following the variable control oscillator. Such a choice insures identical statistics on all outputs which have the same error density selected, because all channels will have time-shifted versions of the same sequence, with near maximum separation between channel-to-channel cross-correlation peaks. If M and N are not powers of 2, care must be taken to insure that the shorter sequences seen by each channel preserve acceptable randomness properties.

As will be recognized by those skilled in the art, there are no particular limitations on the number of combinational logic circuits which can be driven by a single pseudorandom sequence shift register. Each logic circuit as aforestated may use taps used by other logic circuits but it would not use any tap twice as an input to its circuit. The matrix selection switch 17 may be either electronic or mechanical and together with the channel demultiplexer and buffer 18 and retiming buffer 19 may be constructed to service as many data channels as desired. Therefore, the invention supplies not only the ability to select discrete probability densities from a predetermined set of densities, but it also provides this individual selection to a multiplicity of data channels simultaneously.

I claim:
1. A digital error signal generator comprising,
means for producing a primary pseudorandom bit sequence;
logic means for periodically receiving different selected bits from said primary pseudorandom bit sequence, said logic means comprised of a multiplicity of logic circuits for producing a multiplicity of secondary pseudorandom bit sequences, each of said secondary sequences having a different predetermined density;
a multiplicity of output error channels;
means connected to said logic means for sequentially transmitting secondary pseudorandom bit sequences on to said channels; and
means connected to said channels for delaying the transmitted bits in said channels until each channel has received a bit.

2. A digital error signal generator as specified in claim 1 further comprising,
a means for inverting channel data connected to each said output error channel and to a data channel, and
means connected to said output error channels for synchronizing the arrival of said transmitted bits at said inverting means with the arrival of data bits on the corresponding data channels.

3. A digital error signal generator comprising,
means for generating sets of pseudorandom binary signals at a predetermined rate,
logic means for transmitting a binary output signal in response to each said set of pseudorandom signals with a predetermined probability that each output binary signal is a designated type of binary signal, connected to said pseudorandom binary signal generating means, and
switching means connected to said logic means for sequentially switching said output signals onto a predetermined number of channels.

4. A digital error signal generator as specified in claim 3, further comprising,
means connected to each channel for receiving and holding the output signal from each channel, and
means connected to said receiving and holding means for simultaneously transmitting said held signals on an equal number of corresponding channels after all said held channels had each received a binary output signal.

5. A digital error signal generator specified in claim 4, further comprising,
a means for transmitting an error signal to a binary data transmission channel connected to each said corresponding channel for transmitting an error signal whenever said channel receives one of said designated binary output signals.

6. A digital error signal generator comprising:
means for simultaneously generating a multiplicity of pseudorandom binary signals at a predetermined rate;
logic means having a predetermined probability for transmitting a designated binary signal in a series of binary output signals and connected to said pseudorandom binary signal generating means to receive said pseudorandom binary signals at said predetermined rate, said logic means transmitting the signals in said series of binary output signals at said predetermined rate; and
an output error channel connected to said logic means;
means for inverting channel data connected to said output error channel and to a data channel; and
means connected to said output error channel for synchronizing the arrival of said error signal at said inverting means with the arrival of a data bit on the data channel.

* * * * *